United States Patent [19]
Mims

[11] 3,893,223
[45] July 8, 1975

[54] HIGH FREQUENCY VIBRATORY SPOT WELDING OF SHEET METAL

[75] Inventor: Bruce L. Mims, Redding, Conn.

[73] Assignee: Branson Instruments, Incorporated, Stamford, Conn.

[22] Filed: Nov. 29, 1973

[21] Appl. No.: 420,065

[52] U.S. Cl. ................................ 228/110; 228/1
[51] Int. Cl.² ........................................ B23K 21/00
[58] Field of Search ............... 228/1; 29/470, 470.1

[56] References Cited
UNITED STATES PATENTS
3,698,075 10/1972 Boyle ............................. 29/470.1

Primary Examiner—Al Lawrence Smith
Assistant Examiner—Margaret M. Joyce
Attorney, Agent, or Firm—Ervin B. Steinberg

[57] ABSTRACT

This disclosure relates to spot welding of sheet metal members by the use of high frequency vibratory energy. One of the members to be welded is provided with weld locations which are vibration isolated to inhibit propagation of vibratory energy between adjacent weld locations during the weld cycle and thereby prevent the rupture of an adjacent and previously made weld.

13 Claims, 6 Drawing Figures

HIGH FREQUENCY VIBRATORY SPOT WELDING OF SHEET METAL

BRIEF SUMMARY OF THE INVENTION

This invention relates to spot welding of metal members and more particularly to the welding of sheet metal members by the use of vibratory energy. The use of vibratory energy for providing a localized weld is described in U.S. Pat. No. 2,946,119 issued to J. B. Jones et al dated July 26, 1960, entitled "Method and Apparatus Employing Vibratory Energy for Bonding Metals."

Briefly the members to be joined are maintained in forced engagement with one another while vibratory energy having a major component substantially perpendicular to the applied force is applied to one of the members. This action results in a localized weld without fusion at the interface between the members. The described vibratory welding process, also known as high frequency sonic or ultrasonic metal welding, has found widespread application in the manufacture of semiconductors, particularly for the attachment of lead wires to semiconductor wafers, integrated circuit components and the like, see for instance, U.S. Pat. No. 3,698,075, issued to D. F. Boyle, dated Oct. 17, 1972, entitled "Ultrasonic Metallic Sheet Frame Bonding" and U.S. Pat. No. 3,384,283, issued to B. L. Mims, dated May 21, 1968, entitled "Vibratory Wire Bonding."

The vibratory welding process is particularly adapted for welding metals having a high electrical conductivity. Such metals cannot be welded successfully by the conventional electrical resistance weld method since the low electrical resistivity prevents the build-up of heat during the current conduction phase of the welding process. While it has been possible to weld metal foil, such as aluminum foil, by the vibratory welding process, see U.S. Pat. No. 2,946,120, issued to J. B. Jones et al, dated July 26, 1960, entitled "Seam Vibratory Welding Apparatus and Method", it has not been possible to spot weld sheet metal members by this process. As soon as an attempt is made to weld such metal members at incremental spaces, the previously made weld opens. Investigation has shown that the destruction of the previous weld is caused by the lateral propagation of the vibratory energy. When vibratory energy is introduced into the metal member at a location to be welded, the vibratory energy provided and propagated in a direction parallel to the plane of the metal member disrupts the adjacent and previously made weld.

It has been found possible to successfully spot weld sheet metal members to each other if the locations at which a weld is made are vibration isolated from each other. More specifically, the locations at which vibratory energy is applied are constructed and formed in such a manner that the vibratory energy is prevented from being propagated to an adjacent location which has been previously welded.

A principal object of this invention, therefore, is a method for spot welding sheet metal members by vibratory energy.

Another salient object of this invention is a method for spot welding two overlapping sheet metal members to each other using vibratory energy.

A further object of this invention is a method for spot welding two overlapping sheet metal members to each other using vibratory energy, one of the members being provided with weld locations which are vibration isolated to prevent the propagation of vibratory energy between adjacent locations during the weld cycle.

Further and still other objects of this invention will be apparent by reference to the following description and drawings.

DETAILED DESCRIPTION OF THE PREFERRED EMBODIMENT

Figure 1:
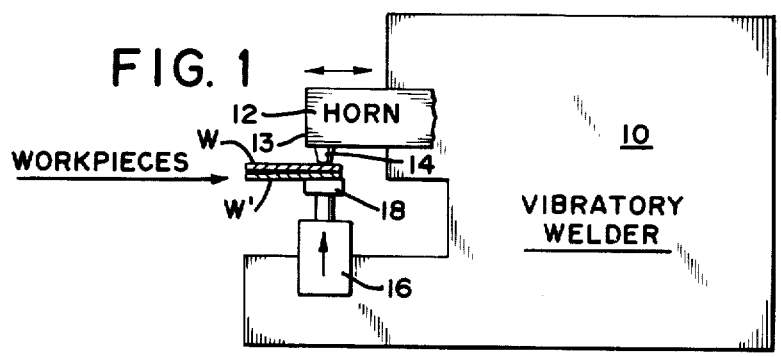
FIG. 1 is an illustration of a vibratory welding apparatus with the workpieces positioned to be spot welded.

In FIG. 1, numeral 10 identifies a vibratory welder substantially as shown in U.S. Pat. No. 3,752,380 issued to A. Shoh, dated Aug. 14, 1973 entitled "Vibratory Welding Apparatus." The welder includes a horn 12 dimensioned to be driven at a predetermined frequency (such as at a frequency in the range from 1 kHz to 100 kHz) to cause high frequency vibratory motion in a direction parallel to the surface of the overlapping workpieces W and W' to be spot welded. A workpiece engaging tip 14 is fastened to the front end 13 of the horn 12, such end being located at an antinodal region of the horn. A force exerting means 16, typically a hydraulic or pneumatic jack with piston 18, is provided to urge the two juxtaposed workpieces W and W' into forced contact with each other and against the workpiece engaging tip 14. Responsive to energizing the vibratory welder 10, the workpiece engaging tip 14 vibrates at the predetermined frequency in a direction substantially perpendicular to the direction of the force applied by piston 18. This action produces a non-fusion weld between both workpieces W and W' as described in U.S. Pat. No. 2,946,119 supra.

Figure 2:
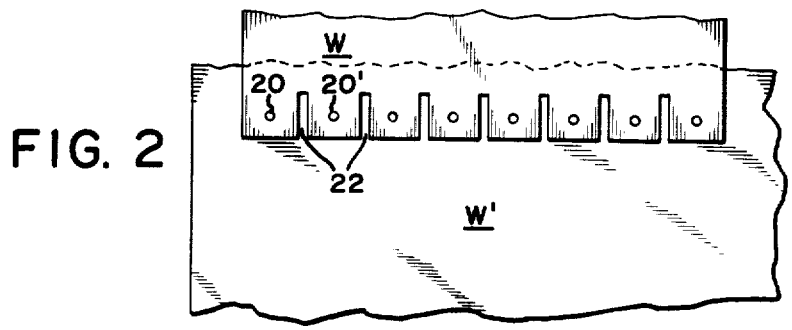
FIG. 2 is a plan view illustrating two members to be spot welded in overlapping relation and one member having an array of slots along the edge.

Investigation has revealed that in order to prevent the vibratory energy provided during welding from breaking an adjacent and previously made weld, it is necessary to laterally decouple the vibratory energy between adjacent spot weld locations. To accomplish such decoupling of the vibratory energy in the direction perpendicular to the applied force and along the plane of the workpiece, the workpiece contacted by the tip 14 is provided with an array of apertures at the location where welding is to be effected, in this instance the edge of the workpiece W. In FIG. 2 the apertures comprise narrow slots 22. The slotted edge is positioned to overlap the workpiece W' which is contacted by the piston, as shown in FIG. 2. The workpiece engaging tip 14 is then brought into contact with the slotted workpiece W at the weld locations 20, 20', etc. to cause spot welding of the two workpieces W and W' to one another. In the present embodiment of the invention it is possible to weld either one spot at a time or a plurality of spots simultaneously, depending upon the horn and tip configuration. Alternatively, a plurality of welding apparatus may be used simultaneously. The apertures or slots 22 in the workpiece prevent the vibratory energy from traveling along the plane of the workpiece to adjacent spot welds where breaking of the previously made spot welds would result.

Figure 3:
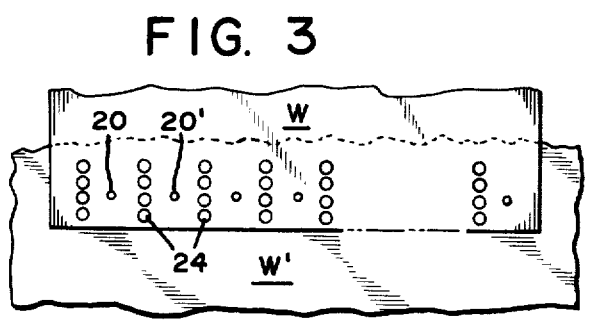
FIG. 3 is a plan view illustrating two members to be spot welded in overlapping relation and one member having a series of closely spaced holes along the edge.

In an alternative embodiment decoupling is achieved by an array of closely spaced holes 24 as illustrated in FIG. 3. The marginal portion of the workpiece W, containing the array of holes 24, overlaps the workpiece W' as shown. The force exerting means 16 causes the workpiece W to be in forced contact with the workpiece engaging tip 14 which, when energized, causes a spot weld at locations 20, 20', etc. The array of closely spaced holes inhibits vibratory energy from being propagated along the workpiece W to neighboring weld locations. In this manner the integrity of the previously made spot welds is maintained.

Figure 4:
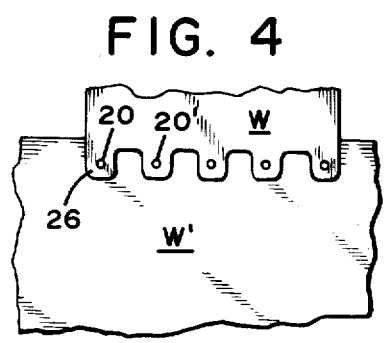
FIG. 4 is a plan view illustrating two members to be spot welded in overlapping relation and one member having an array to tabs along the edge.

FIG. 4 illustrates a further embodiment for decoupling the vibratory energy along the plane of the workpiece W. In the arrangement shown in FIG. 4, tabs 26 are provided at the edge of the workpiece W and the workpieces W and W' are disposed in an overlapped relation. The method of spot welding is as described heretofore.

Figure 5:
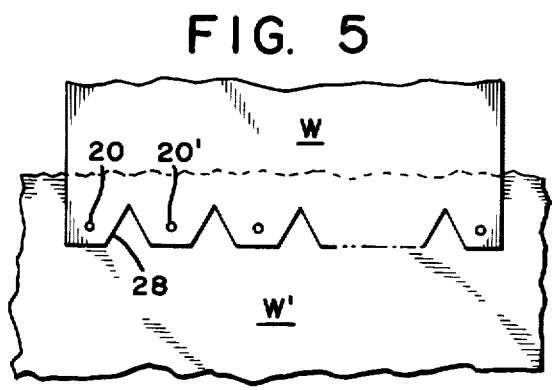
FIG. 5 is a view similar to FIG. 4, but one of the members being provided with an array of triangular cutouts along the edge.

In an alternative embodiment decoupling is achieved by providing the workpiece W with an array of triangular cutouts 28, as shown in FIG. 5. The workpiece W, containing the cutouts 28 overlaps the workpiece W'. Spot welding is achieved as described hereinabove.

Figure 6:
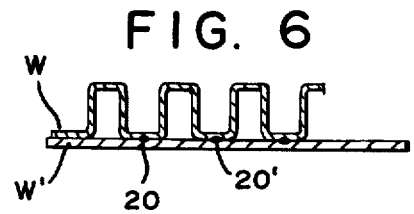
FIG. 6 is a sectional view of a further alternative embodiment wherein one member is corrugated and the other member is a flat piece of sheet metal.

FIG. 6 illustrates a still further embodiment of the present invention wherein the workpiece W has been corrugated. The workpiece engaging tip 14 is forced into contact with the corrugated member W at the weld locations 20, 20', etc. whereat a weld is produced. On account of the corrugated construction, the vibratory energy is decoupled from the workpiece in the direction parallel to the applied vibratory energy so that a previously made weld will not be broken when providing a weld at an incremental space.

The present invention is most useful when the workpieces are sheet metal members, such as steel, brass, copper or aluminum. Same or dissimilar metal members may be welded to each other. Sheet metal may be defined as a relatively thin, yet substantially self supporting metal element capable of transmitting and sustaining ultrasonic vibratory energy in a direction parallel to the plane of the element.

It will be apparent that further variations and modifications of this invention may be made without departing from the principle disclosed. Accordingly, it shall be understood that the foregoing description is merely illustrative of many variations which may be devised for practicing the present invention.

What is claimed is:

1. The method of spot welding two sheet metal members by vibratory energy comprising:
   providing one of said members with means for causing said member to have spaced locations which are substantially vibration isolated from each other with respect to high frequency vibratory energy propagated from one such location along the plane of said member toward an adjacent location;
   disposing said members in overlapping position for causing said locations of said one member to be in contact with the other member, and
   while providing a compressive force between a selected one of said locations and the overlapping portion of the other member, applying to said selected location high frequency vibratory energy having a major component substantially perpendicular to the direction of said force to cause a spot weld.

2. A method of spot welding two sheet metal members as set forth in claim 1, said locations comprising partially separated portions of said one member.

3. A method of spot welding two sheet metal members as set forth in claim 2, said means comprising apertures in said one member.

4. A method of spot welding two sheet metal members as set forth in claim 3, said apertures extending substantially to one edge of said member.

5. A method of spot welding two sheet metal members as set forth in claim 2, said means comprising slots.

6. A method of spot welding two sheet metal members as set forth in claim 2, said means comprising a series of closely spaced holes.

7. A method of spot welding two sheet metal members as set forth in claim 2, said means comprising triangular cutouts.

8. A method of spot welding two sheet metal members as set forth in claim 1, said vibratory energy being in the frequency range from 1 kHz to 100 kHz.

9. A method of spot welding two sheet metal members as set forth in claim 1, said means comprising corrugations in said one member.

10. A method of spot welding two sheet metal members as set forth in claim 1, said members being of the same metal.

11. A method of spot welding two sheet metal members as set forth in claim 1, said members being dissimilar metal.

12. The method of spot welding two sheet metal members by vibratory energy comprising:
   providing one of said members with means for causing said member to have spaced locations which are substantially vibration isolated from each other with respect to high frequency vibratory energy propagated from one such location along the plane of said member toward an adjacent location;
   disposing said members in overlapping position for causing said locations of said one member to be in contact with the other member, and
   while providing a compressive force between selected ones of said locations and the overlapping portion of the other member, applying to said selected locations high frequency vibratory energy having a major component substantially parallel to the plane of said one member to cause spot welds at said selected locations.

13. The method of spot welding two sheet metal members by vibratory energy comprising:
   providing one of said members with means for causing said one member to have along one edge spaced locations which are substantially vibration isolated from each other with respect to high frequency vibratory energy propagated from a selected first one of said locations along the plane of said member toward an adjacent second such location;

disposing said members in overlapping position for causing said first location of said one member to be in contact with the other member;

providing a compressive force between said first location and the overlapping portion of the other member;

applying to said first location, while said force is applied, high frequency vibratory energy having a major component substantially perpendicular to the direction of said force to cause a first spot weld between said members;

providing subsequently a compressive force between said second location and the overlapping portion of said other member, and applying to said second location, while said force is applied, high frequency vibratory energy having a major component substantially perpendicular to the direction of said force to cause a second spot weld between said members without disturbing said first spot weld.

* * * * *